United States Patent [19]

Okazaki et al.

[11] Patent Number: 5,421,463
[45] Date of Patent: Jun. 6, 1995

[54] CARD CONVEY DEVICE

[75] Inventors: Mitsuhiro Okazaki; Akio Inoue; Takashi Yoshioka; Tosiaki Watanabe; Shinji Fukaya, all of Tokyo, Japan

[73] Assignee: Tamura Electric Works, Ltd., Tokyo, Japan

[21] Appl. No.: 214,857

[22] Filed: Mar. 18, 1994

[30] Foreign Application Priority Data

Mar. 19, 1993 [JP] Japan .............................. 5-018127 U

[51] Int. Cl.$^6$ ........................... B07C 5/00; B65H 7/02
[52] U.S. Cl. .................................. 209/559; 209/584; 209/656; 209/900; 271/259
[58] Field of Search ............... 209/547, 552, 559, 567, 209/569, 576, 577, 583, 584, 656, 900, 3.1; 271/258, 259

[56] References Cited

U.S. PATENT DOCUMENTS 5,054,620 10/1991 DeWitt et al. ...................... 209/3.1
5,119,954 6/1992 Svyatsky et al. .................... 209/584

FOREIGN PATENT DOCUMENTS 9528 4/1980 European Pat. Off. ............ 271/259

Primary Examiner—William E. Terrell
Assistant Examiner—Tuan N. Nguyen
Attorney, Agent, or Firm—Blakely, Sokoloff, Taylor & Zafman

[57] ABSTRACT

A card convey device includes a first convey path, a second convey path, a third convey path, jam detector, convey controller, and card sorter. The first convey path conveys a loaded card. The second convey path is branched from the first convey path and conveys a non-defective card distributed from cards conveyed from the first convey path. The third convey path is branched from the first convey path and conveys a defective card distributed from the cards conveyed from the first convey path. The jam detector detects jam of a card occurring in each of the first, second, and third convey paths. The convey controller conveys a card through each of the first, second, and third convey paths at a predetermined speed, stops a convey operation of the card when the jam detector detects jam of the card, and reconveys the card in response to a reconvey command. The card sorter distributes the card conveyed from the first convey path to one of the first and second convey paths on the basis of non-defective/defective information of the card, and forcibly distributes a reconveyed card from the first convey path to the third convey path.

5 Claims, 2 Drawing Sheets

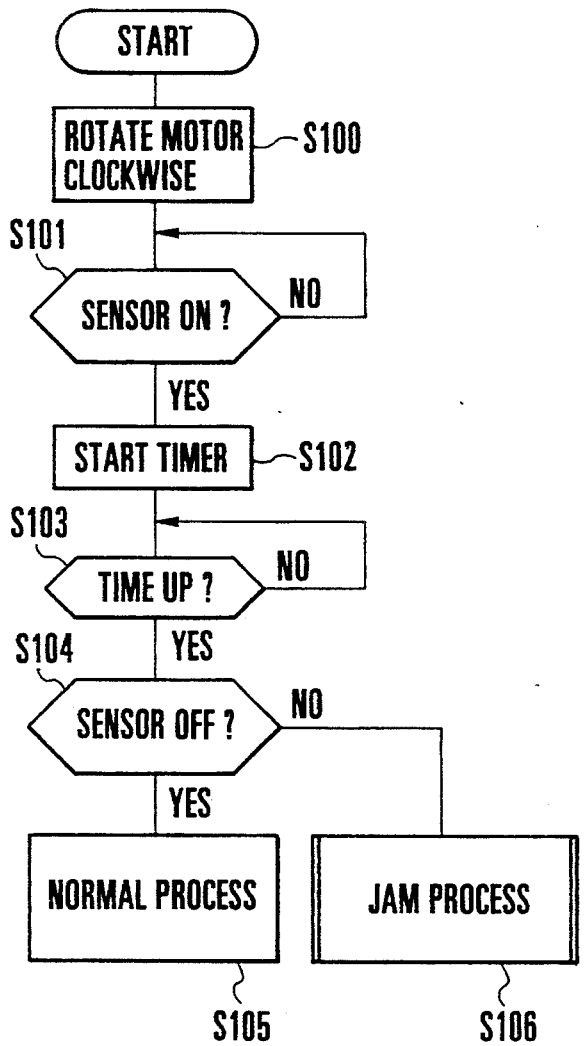
F I G. 2A
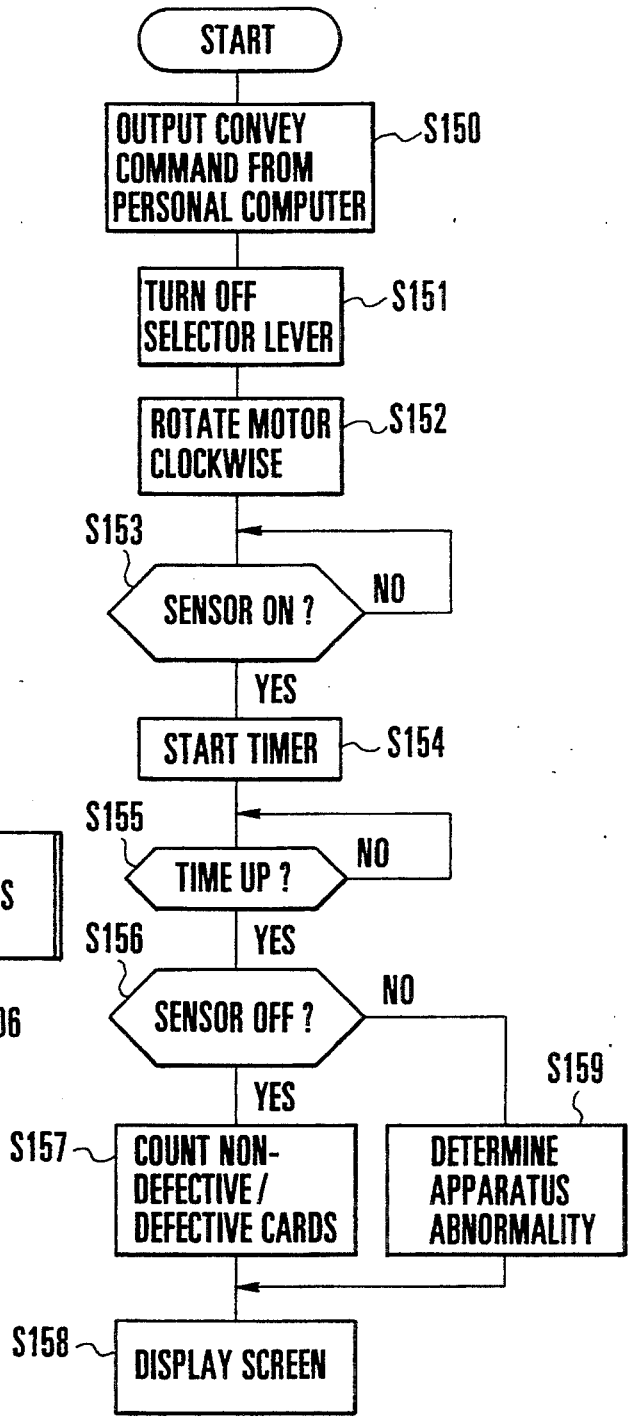
F I G. 2B

CARD CONVEY DEVICE

BACKGROUND OF THE INVENTION

The present invention relates to a card convey device for conveying a card and, more particularly, a card convey device applied to a card issue apparatus for recording value information on a card to issue the card.

A card issue apparatus of this type for magnetically recording value information on a magnetic card to issue the card comprises a card accumulating section for accumulating a large number of non-recorded cards on which no value information corresponding to prepaid information are recorded, a card loading section for loading the non-recorded cards fed from the card accumulating section, a recording/reproducing section for recording/reproducing information on/from the non-recorded cards loaded by the card loading section, a selector section which is controlled on the basis of non-defective/defective information reproduced from the recording/reproducing section to sort the cards into non-defective cards and defective cards, a card storing sections for respectively accumulating the non-defective cards and defective cards sorted by the selector section, and a control section for controlling a card issue operation.

In the above arrangement, when a predetermined number of non-recorded cards are accumulated in the card accumulating section, and a card issue operation is performed, the non-recorded cards are loaded by the loading section one by one at predetermined intervals, the loaded non-recorded cards are conveyed through the convey paths of the card loading section, the recording/reproducing section, and the selector section at a predetermined speed.

When the card loading section loads one of the non-recorded cards, the card loading section detects a common bar code attached to the loaded non-recorded card to check whether value information can be recorded on the non-recorded card. If the value information can be recorded on the non-recorded card, the recording/reproducing section records predetermined value information corresponding to a prepaid amount on the non-recorded card, and reproduces the recorded value information. The control section checks on the basis of the reproduced information of the card from the recording/reproducing section whether the card is non-defective or defective, thereby controlling the selector section. In the selector section, if the card is a non-defective card, the card is exhausted and stored into a non-defective card storing section in the card storing section through a convey path for a non-defective card; if the card is a defective card, the card is exhausted and stored into a defective card storing section in the card storing section through a convey path for a defective card.

However, in a conventional card issue apparatus for performing a series of card issue processes, when a card is jammed in a card issue process, i.e., when jam occurs and the card is not conveyed, convey of the card is immediately stopped, and occurrence of a defective card is informed. In addition, a large number of rollers of the convey paths for conveying the card are manually rotated clockwise and counterclockwise by an operator, thereby exhausting the card left in one of the convey paths. For this reason, the operating efficiency of the card issue apparatus deteriorates, and the operator must perform cumbersome operations.

SUMMARY OF THE INVENTION

It is an object of the present invention to provided a card convey device whose operating efficiency is improved by reducing the number of times the operation of the device is stopped.

It is another object of the present invention to provided a card convey device capable of automatically eliminating jam of a card to reduce the load on an operator.

In order to achieve the above objects, according to the present invention, there is provided a card convey device comprising a first convey path for conveying a loaded card, a second convey path, branched from the first convey path, for conveying a non-defective card distributed from cards conveyed from the first convey path, a third convey path, branched from the first convey path, for conveying a defective card distributed from the cards conveyed from the first convey path, jam detecting means for detecting jam of a card occurring in each of the first, second, and third convey paths, convey control means for conveying a card through each of the first, second, and third convey paths at a predetermined speed, stopping a convey operation of the card when the jam detecting means detects jam of the card, and reconveying the card in response to a reconvey command, and card sorting means for distributing the card conveyed from the first convey path to one of the first and second convey paths on the basis of non-defective/defective information of the card, and forcibly distributing a reconveyed card from the first convey path to the third convey path.

BRIEF DESCRIPTION OF THE DRAWINGS

FIG. 2A is a flow chart showing a jam detecting operation of the card convey device shown in FIG. 1; and FIG. 2B is a flow chart showing a jam processing operation of the card convey device shown in FIG. 1.

DESCRIPTION OF THE PREFERRED EMBODIMENT

Figure 1:
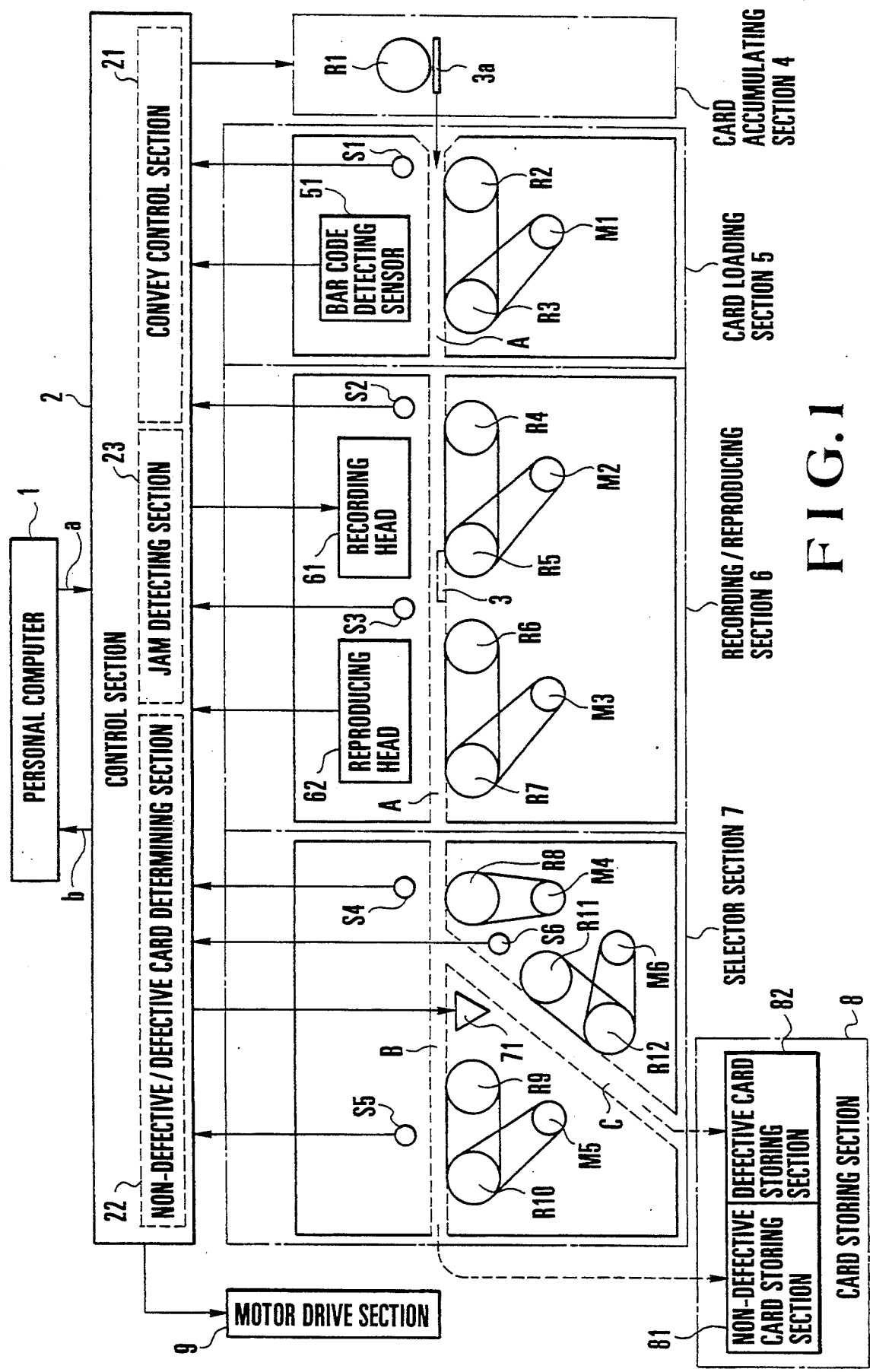
FIG. 1 is a block diagram showing an embodiment of a card issue apparatus including a card convey device according to the present invention.

The present invention will be described below with reference to the accompanying drawings.

FIG. 1 shows an embodiment of a card convey device according to the present invention. The card convey device is applied to a card issue apparatus for magnetically recording value information corresponding to a prepaid amount on a magnetic card to issue the card. Referring to FIG. 1, this card issue apparatus comprises a personal computer 1 for designating and monitoring a card issue operation, a control section 2 having a convey control section 21, a non-defective/defective card determining section 22, and a jam detecting section 23 and designed to control card issue process, a card accumulating section 4 for accumulating a predetermined number of non-recorded cards 3a on which no value information is recorded to feed the non-recorded cards 3a one by one, a card loading section 5 for loading the non-recorded cards 3a fed from the card accumulating section 4, a recording/reproducing section 6 for recording/reproducing value information on the non-recorded cards 3a loaded by the card loading section 5, a selector section 7 for sorting the cards 3 each having the value information recorded thereon and sent from the recording/reproducing section 6 into non-defective/defective cards, a card storing section 8 constituted by a non-defective card storing section 81 and a defective card storing section 82 for respectively storing the non-defective cards and defective cards sorted by the selector section 7, and a motor drive section 9 for driving convey path drive motors respectively arranged in the card loading section 5, the recording/reproducing section 6, and the selector section 7.

Reference numeral 51 denotes a bar code detecting sensor for detecting the bar code of each of the non-recorded cards 3a loaded by the card loading section 5; 61, a recording head for recording value information on the non-recorded cards 3a conveyed to the recording/reproducing section 6; 62, a reproducing head for reproducing the value information recorded on the cards 3; and 71, a selector lever for sorting the cards 3 and 3a into non-defective/defective cards. Reference symbols A, B, and C denote convey paths through which cards are conveyed; S1 to S6, sensors for detecting whether the cards 3 and 3a are properly conveyed on the convey paths A, B, and C; R1, a roller arranged in the card accumulating section 4 to send the non-recorded cards 3a to the convey path A; R2 to R12, rollers for conveying the cards 3 and 3a on the convey paths A, B, and C; and M1 to M6, motors for driving the rollers R2 to R12.

The card loading section 5 has the card convey path B and is constituted by the bar code detecting sensor 51, the sensor S1, the rollers R2 and R3, and the motor M1, the recording/reproducing section 6 has the card convey path B and is constituted by the recording head 61, the reproducing head 62, the sensors S2 and S3, the rollers R4 to R7, and the motors M2 and M3, and the selector section 7 has the card convey paths C and D and is constituted by the selector bar 71, the sensors S4 to S6, the rollers R8 to R12, and the motors M4 to M6.

An operation of the card issue apparatus arranged as described above will be described below.

When the predetermined number of non-recorded cards 3a are accumulated in the card accumulating section 4, and an operator performs a card issue operation using the personal computer 1, a card issue command signal a is sent to the control section 2. The control section 2 rotates the roller R1 in the card accumulating section 4 and performs control such that the non-recorded cards 3a are loaded into the card loading section 5 one by one.

When one of the non-recorded cards 3a is loaded into the card loading section 5, the control section 2 detects and confirms loading of the card 3a through sensor S1. When the control section 2 confirms that the non-recorded card 3a is present in the card loading section 5, the section 21 controls the motor drive section 9 to rotate the motors M1 to M6 at a predetermined speed such that the card 3a or 3 is conveyed on the convey path A at a predetermined speed. Note that the motors M1 to M6 may be rotated before the card is loaded.

The non-defective/defective card determining section 22 of the control section 2 causes the bar code detecting sensor 51 to detect a common bar code representing an issuer, a card type, or the like and attached to the non-recorded card 3a in advance while the non-recorded card 3a is conveyed through the convey path A of the card loading section 5, so as to check whether value information can be recorded on the non-recorded card 3a. If the value information can be recorded, the control section S checks through the sensor S2 whether the non-recorded card 3a is conveyed to the convey path A of the recording/reproducing section 6. If it is detected that the non-recorded card 3a is conveyed to the convey path A, the recording head 61 is driven to record predetermined value information on the non-recorded card 3a. Upon completion of recording on the card 3, the control section 2 confirms through the sensor S3 that the card 3 is close to the reproducing head 62 in the recording/reproducing section 6, and then causes the reproducing head 62 to reproduce the value information recorded on the card 3.

The non-defective/defective card determining section 22 of the control section 2 checks the reproduced information from the recording/reproducing section 6. If it is determined that the value information is properly recorded on the card 3, the control section 2 confirms through the sensor S4 that the card 3 is conveyed to the convey path A of the selector section 7. The control section 2 then drives solenoid (not shown) to switch the selector lever 71 such that the card 3 is conveyed to the convey path B for a non-defective card. As a result, the card 3 is conveyed through the convey path B and stored in the non-defective card storing section 81 of the card storing section 8. On the other hand, if the non-defective/defective card determining section 22 of the control section 2 determines that value information is not properly recorded on the card 3, or if it is determined that a proper bar code is not attached to the non-recorded card 3a, the card 3 or 3a is determined as a defective card. The defective card is stored in the defective card storing section 82 through the convey path C for a defective card.

An operation performed when jam occurs will be briefly described below. In addition to the sensors S1 to S6, sensors (not shown) are arranged at various positions on the convey paths A to C, and the jam detecting section 23 of the control section 2 always checks the conveyed state of a card through a large number of sensors for monitoring small divisions of the convey paths A to C in the card convey direction. When a card is jammed on the convey path A, B, or C, i.e., when jam occurs, and the card 3 or 3a is not properly conveyed, the convey control section 21 receives an output from the jam detecting section 23 and stops rotation of the motors M1 to M6 immediately to stop conveying the card 3 or 3a. The convey control section 21 then informs the personal computer 1 that the convey operation is stopped so as to cause the personal computer to display it. When the personal computer 1 outputs a convey command in response to this, the control section 2 does not perform loading control with respect to the non-recorded card 3a in the card loading section 5, and the convey control section 21 drives the motors M1 to M6 again. In addition, the control section 2 switched the selector bar 71 to the convey path side C to exhaust all the cards 3 and 3a, left on the convey path A, to the defective card storing section 82 through the convey path C. In this case, when the card is left in the convey path B at the occurrence of jam, the card 3 in the convey path B is exhausted to the non-defective card storing section 81. When the card 3 is left in convey path C, the card 3 in the convey path C is exhausted to the defective card storing section 82.

A control operation of the control section 2 of the card issue apparatus shown in FIG. 1 will be described below with reference to the flow charts of FIGS. 2A and 2B. First, the operation will be described below with reference to the flow chart of FIG. 2A.

When the personal computer 1 outputs a card issue command to the control section 2, the control section 2 performs control such that the non-recorded card 3a is fed from the card accumulating section 4 to the card loading section 5. When the sensor S1 of the card loading section 5 detects the non-recorded card 3a from the card accumulating section 4, the convey control section 21 of the control section 2 rotates the motors M1 to M6 clockwise in step S100 such that the non-recorded card 3a is conveyed at a predetermined speed through the convey paths A to C. The jam detecting section 23 of the control section 2 checks in step S101 whether the card properly passes the plurality of sensors S1 to S6 arranged in the convey paths A to C. In this case, upon detecting that the card 3a is present on the sensor S1 when the sensor S1 is turned on, the jam detecting section 23 starts the first timer in step S102. The value of the first timer is set to be slightly larger than a value representing the time required for the card 3a to properly pass the sensor S1.

Thereafter, the jam detecting section 23 checks in step S103 whether the period of time of the first timer is up. If the period of time of the first timer is up, the flow is shifted to step S104 to check whether the sensor which has detected the presence of the card 3a is turned off, i.e., it is checked whether the card 3a has passed the sensor S1. If it is detected that the sensor S1 which is turned on by the presence of the card 3a is turned off, the control section 2 regards that the card 3a is properly conveyed through the convey path A at a predetermined speed, and performs normal processes such as checking of a card convey operation performed by the sequential sensors S2 to S6 and recording/reproducing processes of the card in step S105.

On the other hand, when jam occurs on the convey path A and the card 3a is not properly conveyed on the convey path A, the jam detecting section 23 cannot detect the OFF state of the corresponding sensor in step S104. In this case, the convey control section 21 of the control section 2 immediately stops driving the motors M1 to M6 to inform the personal computer 1 that the jam has occurred and to display the corresponding information on the screen of the personal computer 1. Thereafter, the flow is shifted to step S106 to perform a jam process, i.e., to the routine shown in FIG. 2B.

In the jam process shown in FIG. 2B, the control section 2 performs the following operations.

Upon receiving a card convey command from the personal computer 1 in step S150, the convey control section 21 turns off, in step S151, the selector bar 71 of the selector section 7 which is normally set in an OFF state to make sure that the selector bar 71 is set in an OFF state in order to exhaust all the cards 3a left in the convey path A to the defective card storing section 82. In step S152, the convey control section 21 rotates the motors M1 to M6 counterclockwise. In step S153, ON/-OFF state determination is performed with respect to the sensor S1 located at a position at which a defective card convey operation has been detected in the card convey detecting process of FIG. 2A. If it is detected that the OFF state of the sensor S1 is detected, the second timer having a timer time slightly larger than a value representing the time required for the card 3a to pass the sensor is started.

It is checked in step S155 whether the period of time of the second timer is up. If YES in step S155, the flow is shifted to step S156 to check the OFF state of the sensor S1 located at the position at which the defective card convey operation has been detected. If the OFF state of the sensor S1 is detected, it is regarded that the card 3a which was jammed has been conveyed, checking of a card convey operation or the like is performed by the next sensors S2 to S6, and the card 3a left in the convey path A is stored in the defective card storing section 82. Note that, when jam occurs in the convey path B, the card left in the convey path B is stored in the non-defective card storing section 81. Non-defective cards and defective cards are counted, and the results obtained by the counting are sent to the personal computer 1 so as to be displayed on the screen of the personal computer 1 in step S158.

Assume that when the jammed card 3a is to be conveyed again. In this case, if the card 3a is not properly conveyed yet, and the OFF state of the sensor S1 which has detected the defective card convey operation is not detected, it is determined in step S159 that apparatus abnormality, i.e., permanent jam, occurs, and information indicating the apparatus abnormality is displayed on the display screen of the personal computer 1 in step S158.

Note that, in the above embodiment, when a defective card convey operation is detected, a reconvey operation for the card is started by a convey command from the personal computer 1. However, the personal computer 1 or the control section 2 may automatically output a reconvey command for the card in response to the detection of the defective card convey operation.

As described above, according to this embodiment, when a card is jammed in a convey path, the motors are driven again to exhaust the card.

As has been described above, according to the present invention, when card jam in each convey path is detected, the card is reconveyed, the reconveyed card in a first convey path is controlled to be forcibly distributed to a third convey path. For this reason, the card left in the first convey path is automatically exhausted through the third convey path, or the cards left in the second and third convey paths can be automatically exhausted through the corresponding convey paths, respectively, thereby reducing the load on an operator.

What is claimed is:

1. A card convey and sorting device comprising:
    a first convey path for conveying a loaded card;
    a second convey path, branched from said first convey path, for conveying a non-defective card distributed from cards conveyed from said first convey path;
    a third convey path, branched from said first convey path, for conveying a defective card distributed from the cards conveyed from said first convey path;
    jam detecting means for detecting jam of a card occurring in each of said first, second and third convey paths;
    convey control means for performing controls to convey a card through each of said first, second and third convey paths at a predetermined speed, to stop a convey operation of the card when said jam detecting means detects jam of the card, and to reconvey the card in response to a reconveying command;
    card sorting means for distributing the card conveyed from said first convey path to one of said second and third convey paths on the basis of non-defective/defective information of the card, and forcibly distributing a reconveyed card from said first convey path to said third convey path;

a plurality of sensors arranged in said first, second and third convey paths, respectively;

timer means having a timer time slightly longer than a time required for the card to pass said sensor and is started in response to a card detection output from one of said sensors which detects the presence of the card when the card is reconveyed by a control operation of said convey control means; and detecting means for determining permanent jam of the card when one of said sensors continuously detects the presence of the card after the timer time of said timer mean has elapsed.

2. A card convey and sorting device comprising:

a first convey path for conveying a loaded card;

a second convey path, branched from said first convey path, for conveying a non-defective card distributed from cards conveyed from said first convey path;

a third convey path, branched from said first convey path, for conveying a defective card distributed from the cards conveyed from said first convey path;

convey control means for performing controls to convey a card through each of said first, second, and third convey paths at a predetermined speed, to stop convey operation of the card when a jam of the card is detected, and to reconvey the card in response to a reconvey command;

jam detecting means for detecting jam of a card occurring in any of said first, second, and third convey paths, said jam detecting means is constituted by a plurality of sensors arranged in said first, second, and third convey paths, respectively, a first timer and a second timer both having timer times slightly longer than a time required for a card to pass the sensor and said first timer is started when one of said sensors detects the presence of a card, and first determining means for determining that the card is jammed when one of said sensors which has detected the presence of the card continuously detects the presence of the card after the timer time of said first timer has elapsed; said second timer is started in response to a card detection output from one of said sensors which detects the presence of the card when the card is reconveyed by a control operation of said convey control means, and second determining means for determining permanent jam of the card when one of said sensors continuously detects the presence of the card after the timer time of said second timer has elapsed; and card sorting means for distributing the card conveyed from said first convey path to one of said second and third convey paths on the basis of non-defective/defective information of the card, and forcibly distributing a reconveyed card from said first convey path to said third convey path.

3. A device according to claim 2, further comprising non-defective/defective card determining means for reading information recorded on a card which is being conveyed through said first convey path and checking, on the basis of the read information, whether the card is non-defective or defective, thereby controlling said card sorting means.

4. A device according to claim 3, further comprising bar code reading means for reading bar code information recorded in advance on the card which is being conveyed through said first convey path, information recording means for recording predetermined information on the card which is being conveyed through said first convey path, and information reproducing means for reading the information recorded by said information recording means, and wherein said non-defective/defective card determining means checks, on the basis of outputs from said bar code reading means and said information reproducing means, whether the card is non-defective or defective.

5. A device according to claim 2, wherein when said jam detecting means detects that jam occurs in said second convey path, said convey control means performs a reconveying control of a card left in said second convey path as a non-defective card.

* * * * *